United States Patent [19]

Bianchi et al.

[11] 4,175,642
[45] Nov. 27, 1979

[54] PASSIVE LUBRICATION METHOD AND SYSTEM

[75] Inventors: Maurice P. Bianchi, Palos Verdes Estates; Louis A. Rosales, Manhattan Beach, both of Calif.

[73] Assignee: TRW Inc., Redondo Beach, Calif.

[21] Appl. No.: 869,341

[22] Filed: Jan. 13, 1978

[51] Int. Cl.² ............................................. F16N 7/12
[52] U.S. Cl. ................................. 184/1 E; 184/102; 252/12.2
[58] Field of Search ................. 184/102, 100, 1 E, 64, 184/16, 19; 252/12.2, 58

[56] References Cited

U.S. PATENT DOCUMENTS

| 2,583,457 | 1/1952 | Woodall | 184/102 |
| 2,665,960 | 1/1954 | Causley | 252/12.2 X |
| 3,055,297 | 9/1962 | Leeds | 184/1 E X |
| 3,414,084 | 12/1968 | Bues et al. | 184/1 E |
| 3,445,393 | 5/1969 | Hinds | 184/1 E |
| 3,955,646 | 5/1976 | Luebkemann | 184/1 E X |
| 3,994,814 | 11/1976 | Cairns | 252/12.2 X |
| 4,028,324 | 6/1977 | Tuschner et al. | 252/58 X |

FOREIGN PATENT DOCUMENTS 1022384  3/1966  United Kingdom ................. 184/1 E Primary Examiner—David H. Brown
Attorney, Agent, or Firm—John J. Connors; Donald R. Nyhagen

[57] ABSTRACT

Surfaces to be lubricated are supplied with lubricating oil by containing the oil within a reservoir filled with a porous oleophobic mass forming an oil receptacle which is impregnated with the oil, and communicating the reservoir to the surfaces to effect expulsion of oil from the reservoir to the surfaces by the negative capillary forces active on the oil within the receptacle pores.

15 Claims, 7 Drawing Figures

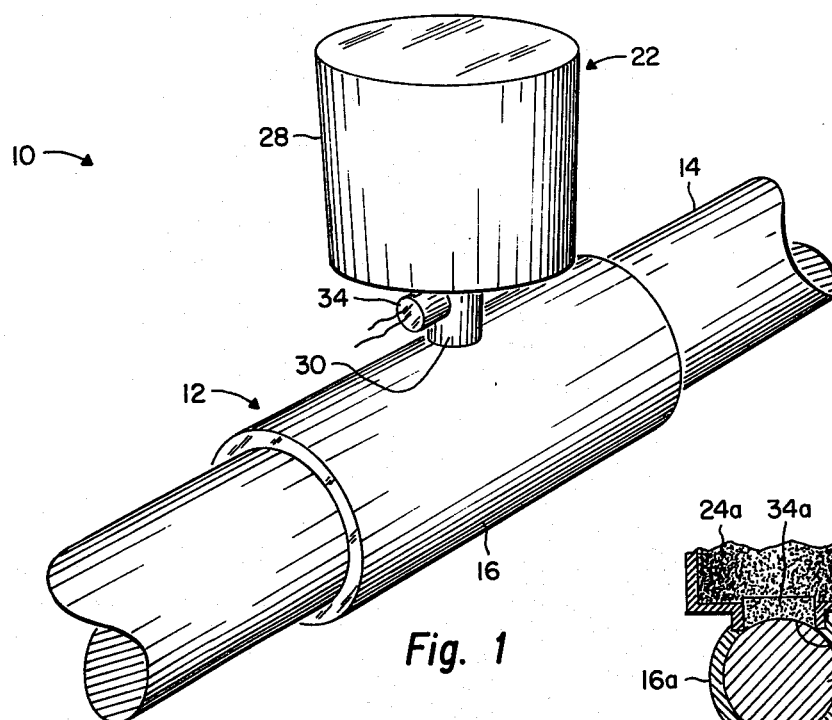
Fig. 1
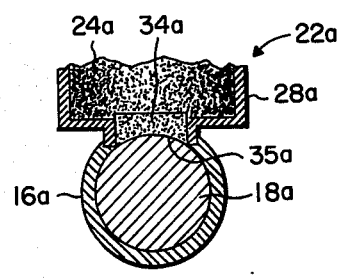
Fig. 4
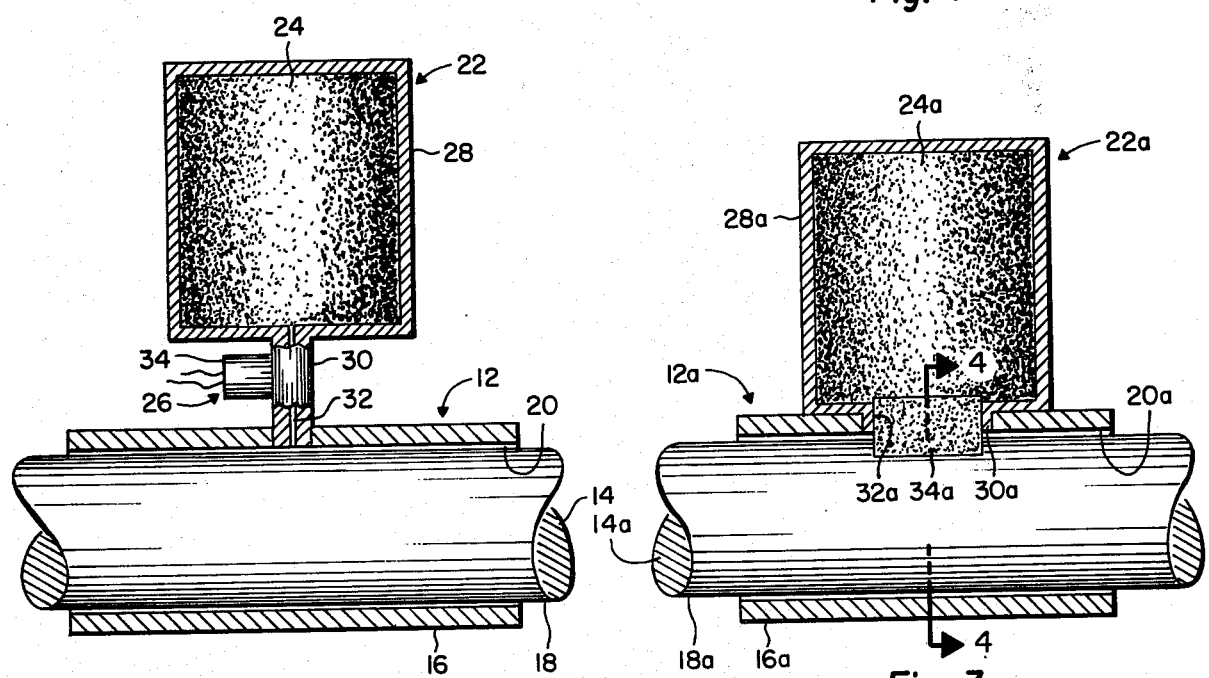
Fig. 2
Fig. 3

PASSIVE LUBRICATION METHOD AND SYSTEM

The invention herein described was made in the course of or under a contract or subcontract thereunder, with the Department of the Air Force.

BACKGROUND OF THE INVENTION

1. Field

This invention relates generally to the art of lubrication and more particularly to a novel passive lubricating method and system for supplying lubricating oil to surfaces to be lubricated.

2. Prior Art

Effective lubrication of bearing surfaces is essential in most if not all machines. This is particularly true of machines destined for operation in space. In this case, the lubricating system must be designed to remain effective and operable without attention for the entire intended lifetime of the space machine. This lifetime may be ten years or more. One example of such a lubrication requirement involves the lubrication of the bearings for the despun platform of a dual-spin spacecraft.

In this regard, it will be understood that the space environment presents a rather hostile environment for lubricating systems. This is due not only to the temperatures and temperature fluctuations encountered but also to the vacuum of the environment which tends to cause relatively rapid evaporation of lubricating oil from the bearing surfaces being lubricated. Such evaporation is minimized by using lubricating oils having as low a vapor pressure as possible. Even then, however, some type of lubricating system must be provided for maintaining an adequate supply of lubricant to the bearing surfaces over the entire operating lifetime of the spacecraft without flooding of the surfaces with oil.

Lubricating systems for these purposes are commonly classified as passive and active systems. An active lubrication system is one in which some type of mechanically or electrically produced force is utilized to induce flow of lubricant from a lubricant reservoir or the like to the bearing surfaces to be lubricated. In a passive lubrication system, this lubricant flow is induced by natural forces, such as capillary forces.

One type of passive spacecraft bearing lubrication system in current use comprises a porous oil reservoir in the form of a porous nylon block or the like saturated or impregnated with oil. This reservoir is placed near or in contact with the surfaces to be lubricated and is designed to supply oil to the surfaces by evaporation from the reservoir and condensation on the bearing surfaces. Means are provided to regulate the replenishment rate at which oil is condensed on the bearing surfaces so as to maintain the proper amount of lubricant on the surfaces.

Such porous nylon reservoir type lubrication systems, however, have an inherent defect which this invention is intended to overcome. Thus, recent studies have demonstrated that if incompletely filled or saturated with oil, such porous nylon blocks, rather than dispensing oil to the bearing surfaces, actually imbibe or absorb oil. In other words, they function as oil sinks rather than oil reservoirs. Accordingly, this type of passive lubricating system is ill-suited to or totally incapable of use for spacecraft bearing lubrication.

This deficiency of the porous nylon oil reservoir is believed due to the fact that nylon is an oleophillic material, that is a material which is wetted by oil. As a consequence, capillary forces tend to suck oil into the reservoir.

SUMMARY OF THE INVENTION

This invention provides an improved passive lubrication method and system which avoid the above deficiency of the porous nylon oil reservoir. In this improved lubricating system, capillary forces tend to expel oil from rather than draw oil into the reservoir.

To these ends, the lubricating system of the invention has an oil reservoir including an oil receptacle in the form of porous oil impregnated or saturated mass of oleophoebic material. Since the oil does not wet this material, the capillary forces active on the oil within the receptacle pores are negative capillary forces which act to expel the oil from the pores rather than draw oil into the pores. This oil reservoir is disposed in communication with the bearing surfaces to be lubricated to effect expulsion of oil from the reservoir to the surfaces by these negative capillary forces. Means are provided for regulating oil flow to the bearing surfaces to assure adequate lubrication of the surfaces without flooding of the latter by oil.

In the described inventive embodiments, the porous oleophobic oil receptacle is contained within a surrounding oil-impervious, oleophoebic enclosure. Opening through the enclosure wall is an oil outlet capillary through which oil flow occurs from the contained oil receptacle to the bearing surfaces to be lubricated. Oil flow through this outlet capillary to the bearing surfaces is regulated in one embodiment by a valve, in a second embodiment by a porous oleophillic block which contacts a bearing surface, and in a third embodiment by a porous oleophillic block movable into and from contact with a bearing surface.

BRIEF DESCRIPTION OF THE DRAWING

FIG. 1 is a perspective view of a passive lubrication system according to the invention installed on a journal bearing for lubricating the bearing surfaces;

FIG. 2 is an enlarged section through the bearing and lubricating structure of FIG. 1;

FIG. 3 is a section through a journal bearing equipped with a modified lubrication system according to the invention;

FIG. 4 is a section taken on line 4—4 in FIG. 3;

DESCRIPTION OF THE PREFERRED EMBODIMENTS

Figure 5:
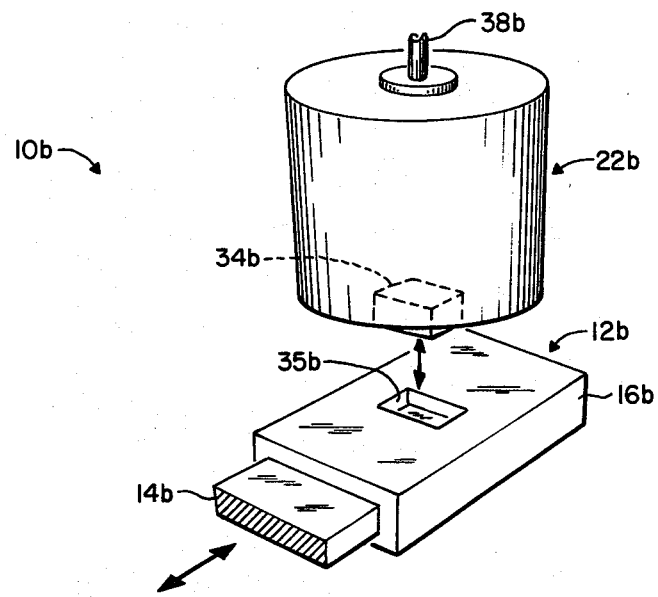
FIG. 5 is a perspective view of a further modified lubrication system according to the invention for a slide bearing.

In general terms, the invention provides a passive lubrication system for supplying lubricating oil to surfaces, typically bearing surfaces, to be lubricated. This lubrication system has an oil reservoir including an oil receptacle in the form of a unitary porous oleophobic body, such as a polytetrafluorethylene sponge, containing a myriad of capillary pores impregnated or saturated with oil, and means for communicating the reservoir to the surfaces to be lubricated for capillary expulsion of oil from these capillary pores to the surfaces.

Turning first to FIGS. 1 and 2 of the drawings, there is illustrated such a passive lubrication system 10 according to the invention for a journal bearing 12. This bearing has a journal or shaft 14 rotatably supported in a bearing sleeve 16. In this case, the surfaces to be lubricated are bearing surfaces, namely, the surface 18 of the shaft 14 and the internal bearing surface 20 of the bearing sleeve 16.

Lubrication system 10 comprises an oil reservoir 22 including a porous oil receptacle 24 in the form of a unitary porous body oleophobic material containing a myriad of capillary pores impregnated or saturated with oil. Since the material of this oil receptacle is not wetted by the oil, the capillary forces active on the oil within the receptacle pores are essentially negative capillary forces which tend to expel the oil from rather than draw the oil into the pores. Means 26 are included in the lubrication system for selectively communicating the oil reservoir 22 to the bearing surfaces 18, 20 for capillary expulsion of oil from the reservoir to these surfaces.

In the particular lubrication system 10 illustrated, the porous oleophobic oil receptacle 24 is contained within an outer oil-impervious oleophobic enclosure 28. This enclosure may be a separate container, as shown, constructed of an oleophobic material or having an inner oleophobic surface coating. Alternatively, the enclosure may be an oil impervious, oleophobic layer or coating deposited directly on the surfaces of the oil receptacle 24.

The means 26 for selectively communicating the oil reservoir 22 to the bearing surfaces 18, 20 to be lubricated comprises an oil outlet capillary tube 30 of oleophobic material or having an inner oleophobic surface coating extending from the reservoir enclosure 28 to the bearing surfaces to be lubricated. The outlet passage 32 through this tube is a capillary passage which opens at one end to the interior of the enclosure and at the other end through the wall of the bearing sleeve 16 to the clearance space between the bearing surfaces 18, 20. The negative capillary forces on the oil within the porous oleophoebic oil receptacle 24 and the outlet capillary 32 expel the oil from the pores through the oil passage 32, to the bearing surfaces 18, 20.

The communicating means 26 of the lubrication system 10 also comprises means 34 for regulating oil flow through the oil outlet capillary or passage 32 to the bearing 12 to assure adequate lubrication of the bearing surfaces 18, 20 with flooding of these surfaces with oil. The particular flow regulating means 34 shown comprises a valve, such as a solenoid valve, for regulating the net oil flow rate either by opening and closing or variably restricting oil flow through the passage.

It will now be understood that during operation of the passive lubrication system 10, the negative capillary forces on the oil within the oil reservoir 22 tends to expel the oil from the porous oleophobic oil receptacle 24 into the outlet passage 32 from the reservoir. When the reservoir valve 34 is open, these capillary forces expel the oil through the passage to the bearing 12 to lubricate the bearing surfaces 18, 20. Flow of oil to the bearing surfaces is terminated by closing the valve, whereby adequate lubrication of these surfaces without flooding may be achieved by proper operation of the valve.

In FIGS. 3 and 4, the oil reservoir 22a has a porous oleophobic oil receptacle 24a within an outer oil impervious oleophobic enclosure or container 28a. This container has an outlet 32a of relatively large diameter surrounded by a lip 30a on the container and containing a porous oil conductor in the form of an oleophillic block 34a, such as a porous nylon block. The reservoir is mounted on the bearing 12a to the lubricated with the outlet lip 30a fixed within an opening in the bearing sleeve 16a. The outer end face 35a of the porous block 34a is disposed in seating contact with the shaft surface 18a. This end face is curved to fit the shaft, as shown in FIG. 4. The inner end face of the porous block 34a is exposed to the oil in the reservoir 22a which impregnates or saturates the porous oleophobic oil receptacle 24a. As in the first embodiment of the invention, the oleophobic material of the oil receptacle creates negative capillary forces which tend to expel the oil from the reservoir. The oil migrates through the pores of the block 34a, by the joint action of this capillary expulsion force and the positive capillary forces in the block, to the shaft surface 18a and the bearing sleeve surface 20a.

In this form of the invention, the porous block 34a effectively forms a one way valve which regulates the rate of oil flow from the oil reservoir 22a to the bearing 12a. A desired flow rate is achieved by appropriately sizing the pores of the block. The flow rate may be changed by replacing the block with one of another pore size.

Figure 6:
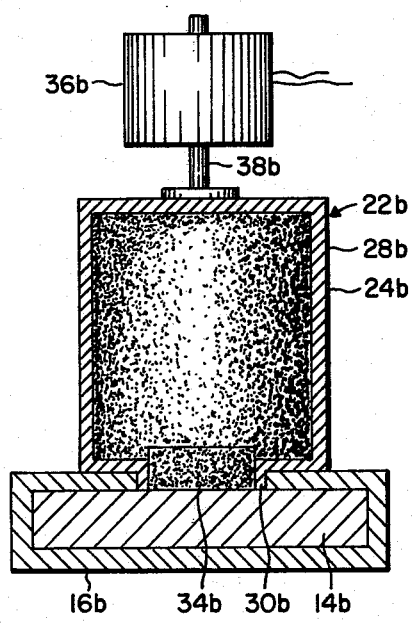
FIGS. 6 and 7 are sections through the bearing and lubricator structure in FIG. 5 illustrating the manner in which oil flow to the bearing surfaces is regulated.
Figure 7:
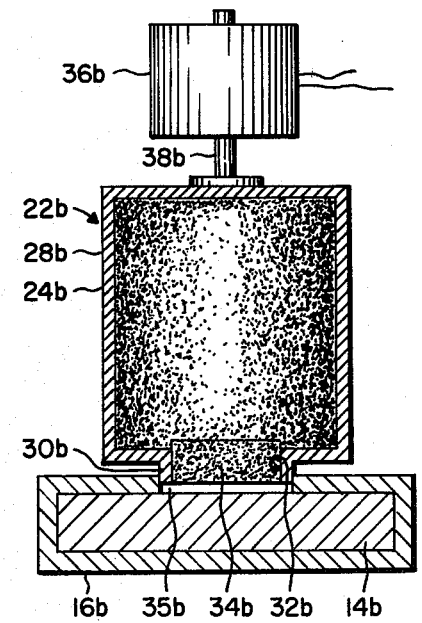

FIGS. 5-7 illustrate a slide bearing 12b with a further modified lubrication system 10b according to the invention. Bearing 12b has an inner bearing member or slide 14b movable endwise in an outer bearing member or sleeve 16b.

The lubrication system 10b comprises an oil reservoir 22b essentially like that of FIGS. 3 and 4 including an outer oleophobic container 28b enclosing an inner porous oleophobic oil receptacle 24b. Container 28b has an oleophobic oil outlet 32b containing a porous oleophillic block 34b and surrounded by a lip 30b on the container. This lip slides in an opening 35b in the wall of the bearing sleeve 16b.

The oil reservoir 22b is movable between its extended lubricating position of FIG. 6 and its retracted non-lubricating position of FIG. 7. In its lubricating position of FIG. 6, the porous reservoir outlet block 34b seats against the bearing slide 14b to lubricate the latter in essentially the same manner as described in connection with FIGS. 3 and 4. In the retracted position of the oil reservoir, the block 34b is retracted from contact with the slide to terminate oil flow to the slide. The reservoir 22b is movable between these positions in any convenient manner, as by a solenoid 36b having a plunger 38b attached to the reservoir.

For ease of illustration and description, the bearings to be lubricated are shown in simplified fashion. It will be recognized, of course, that the invention may be utilized to lubricate virtually any type of bearing.

Following is a list of materials and material parameters considered to be suitable for use in the invention.

| Oleophobic Oil Receptacle Material | | |
| --- | --- | --- |
| Porous Polytetrafluoroethylene | | |
| Pore Size-Average | (Microns at 2 psi) | 5 to 50 |
| Void Content | (%) | 5 to 55 |
| Density | | 0.97 to 1.29 |

OLEOPHOBIC CONTAINER AND OUTLET PASSAGE MATERIAL

Polytetrafluoroethylene (TFE-Teflon)
Fluoronated ethylene propylene (FEP-Teflon)
Perfluoroalkoxy-ethylene copolymer (PFA-Teflon)

| Oils | | | |
|---|---|---|---|
| Vak-Kote™ - (Ball Brothers Research) | | | |
| Grade - | 36218 | 36233 | 36234 |
| Viscosity ($10^{-6}$ m²/sec at 100° F.) | 78 | 100 | 56 |
| Viscosity Index | 110 | 93 | 129 |
| Surface Tension (Dynes/cm. 73° F.) | 23 | 34 | 28.5 |
| KG-80™ - (Kendall Refining Company) | | | |
| Viscosity ($10^{-6}$ m²/sec at 100° F.) | 164 | | |
| Viscosity Index | 101 | | |

What is claimed:

1. In combination:
   surfaces to be lubricated, and
   means for lubricating said surfaces comprising an oil reservoir including an oil receptacle in the form of a unitary porous oleophobic body containing a myriad of capillary pores and adapted to be impregnated with lubricating oil, and means for communicating said reservoir to said surfaces to effect transfer of oil from said body to said surfaces by capillary expulsion of oil from the pores in said body to said surfaces.

2. The combination of claim 1 wherein:
   said porous body comprises a polytetrafluoroethylene sponge.

3. The combination of claim 1 wherein:
   said communicating means comprises an oil passage communicating said reservoir to said surfaces, and means for controlling oil flow through said passage from said reservoir to said surfaces.

4. The combination of claim 1 wherein:
   said communicating means comprises an oil passage communicating said reservoir to said surfaces, and means for selectively controlling oil flow through said passage from said reservoir to said surfaces.

5. The combination of claim 1 wherein:
   said communicating means comprises an oil passage communicating said reservoir to said surfaces, and valve means for selectively controlling oil flow through said passage from said reservoir to said surfaces.

6. The combination of claim 1 wherein:
   said communicating means comprises a porous oil conductor between said reservoir and said surfaces.

7. The combination of claim 1 wherein:
   said communicating means comprises a porous oil conductor having one surface exposed to said reservoir and another surface in contact with one of said surfaces to be lubricated, whereby oil flow occurs from said reservoir, through said conductor, to said surfaces to be lubricated.

8. The combination of claim 1 wherein:
   said communicating means comprises a porous oil conductor having one surface exposed to said reservoir, and means for effecting movement of said oil conductor to and from a position of contact with one of said surfaces to be lubricated, whereby oil flow occurs from said reservoir, through said conductor, to said surfaces to be lubricated when said conductor occupies said contact position.

9. Means for supplying oil to surfaces to be lubricated, comprising:
   an oil reservoir including an oil receptacle in the form of a unitary porous oleophobic body containing a myriad of capillary pores and adapted to be impregnated with lubricating oil, and
   means for communicating said reservoir to the surfaces to be lubricated to effect transfer of oil from said body to said surfaces by capillary expulsion of oil from the pores in said body to said surfaces.

10. The subject matter of claim 9 wherein:
    said porous body comprises a polytetrafluoroethylene sponge.

11. The subject matter of claim 9 wherein:
    said communicating means comprises an oil outlet from said reservoir for conducting oil to said surfaces, and means for controlling oil flow through said outlet.

12. The subject matter of claim 9 wherein:
    said communicating means comprises an oil outlet from said reservoir for conducting oil to said surfaces, and valve means for controlling flow through said outlet.

13. The subject matter of claim 9 wherein:
    said communicating means comprises an oil outlet from said reservoir for conducting oil to said surfaces, and a porous oil conductor in said outlet having one surface exposed to the interior of said reservoir and another surface for contact with one of said surfaces to be lubricated.

14. The method of lubricating surfaces, comprising the steps of:
    containing lubricating oil with an oil receptacle comprising a porous oleophobic body containing a myriad of capillary pores impregnated with said oil, and
    communicating said receptacle to said surfaces to effect transfer of oil from said receptacle to said surfaces by capillary expulsion of oil from the pores in said body to said surfaces.

15. The method of claim 14 including the step of regulating oil flow from said receptacle to said surfaces.

* * * * *